US012383099B2

(12) United States Patent
Santos

(10) Patent No.: US 12,383,099 B2
(45) Date of Patent: Aug. 12, 2025

(54) GRINDER FOR PLANT SUBSTANCES

(71) Applicant: Rodrigo Escorcio Santos, Rockville, MD (US)

(72) Inventor: Rodrigo Escorcio Santos, Rockville, MD (US)

( * ) Notice: Subject to any disclaimer, the term of this patent is extended or adjusted under 35 U.S.C. 154(b) by 171 days.

(21) Appl. No.: 18/208,424

(22) Filed: Jun. 12, 2023

(65) Prior Publication Data

US 2023/0320530 A1  Oct. 12, 2023

Related U.S. Application Data

(63) Continuation-in-part of application No. 17/564,311, filed on Dec. 29, 2021, now Pat. No. 11,690,480.

(60) Provisional application No. 63/132,092, filed on Dec. 30, 2020.

(51) Int. Cl.
*A47J 42/20* (2006.01)
*A47J 42/14* (2006.01)
*A47J 42/40* (2006.01)

(52) U.S. Cl.
CPC ............... *A47J 42/20* (2013.01); *A47J 42/14* (2013.01); *A47J 42/40* (2013.01)

(58) Field of Classification Search
CPC ............. A47J 42/20; A47J 42/14; A47J 42/40
See application file for complete search history.

(56) References Cited

U.S. PATENT DOCUMENTS

| 3,581,790 | A | 6/1971 | Conte |
| 6,508,424 | B1 | 1/2003 | Marshall |
| 2019/0343333 | A1* | 11/2019 | Wiener ............. A47J 42/34 |
| 2022/0071448 | A1* | 3/2022 | Hansen ............. A47J 42/24 |

FOREIGN PATENT DOCUMENTS

| BE | 894584 A | | 1/1983 |
| CN | 102133029 A | * | 7/2011 |
| DE | 202008011495 U1 | | 2/2009 |
| FR | 1253288 A | | 2/1961 |
| WO | 1988002613 A1 | | 4/1988 |

OTHER PUBLICATIONS

English translate (CN102133029A), retrieved date Jan. 22, 2025.*

* cited by examiner

*Primary Examiner* — Mohammed S. Alawadi
(74) *Attorney, Agent, or Firm* — Edell, Shapiro & Finnan, LLC

(57) ABSTRACT

A grinder for a plant substance includes a first grinding section having a first surface and a second grinding section having a second surface and a sidewall extending from the second surface. An edge of the sidewall of the second grinding section is configured to abut the first grinding section to form a gap that separates the first surface and the second surface from one another, and at least one of the first surface or the second surface includes bumps that extend into, but not across, the gap formed by abutment of the edge of the sidewall of the second grinding section against the first grinding section to encourage rolling friction between the plant substance and the bumps to grind the plant substance. At least a portion of one of the first grinding section or the second grinding section is composed of a silicone material.

20 Claims, 8 Drawing Sheets

| Notes | Glinder 1 | Glinder 2 | Glinder 3 | Glinder 4 | Glinder 5 | Glinder 6 |
|---|---|---|---|---|---|---|
| Sample Type | Papaya Syrup | Papaya Syrup | Papaya Syrup | Papaya Syrup | Papaya Syrup | Papaya Syrup |
| Sample ID | THC Dominant Plant | THC Dominant Plant | THC Dominant Plant | THC Dominant Plant | THC Dominant Plant | THC Dominant Plant |
| Weight | 0.301 | 0.304 | 0.302 | 0.321 | 0.303 | 0.303 |
| Solvent Volume | 30 | 30 | 30 | 30 | 30 | 30 |
| Moisture Correction | 10.00% | 10.00% | 10.00% | 10.00% | 10.00% | 10.00% |
| Temperature | 25.3 °C | 25.4 °C | 26.5 °C | 26.3 °C | 26.4 °C | 26.4 °C |
| Total THC | 23.8% | 24.7% | 23.1% | 21.1% | 26.4% | 26.1% |
| THC-A | 27.1% | 28.2% | 26.3% | 24.1% | 30.1% | 29.8% |
| CBD | ND | ND | ND | ND | ND | ND |
| CBD-A | ND | ND | ND | ND | ND | ND |
| Δ9-THC | ND | ND | ND | ND | ND | ND |
| Total CBD | ND | ND | ND | ND | ND | ND |
| CBG-A | 1% | 0.96% | 0.87% | 0.84% | 1.10% | 1.40% |
| CBG | ND | ND | ND | ND | ND | ND |
| CBC-A | ND | ND | ND | ND | 0.67% | 0.56% |
| CBC | ND | ND | ND | ND | ND | ND |
| CBN-A | ND | ND | ND | ND | ND | ND |
| CBN | ND | ND | ND | ND | ND | ND |
| THCV-A | ND | ND | ND | ND | ND | ND |
| THCV | ND | ND | ND | ND | ND | ND |
| Terpenes | Low | Low | Low | Low | Low | Medium |
| Δ10-THC | n/a | n/a | n/a | n/a | n/a | n/a |
| Δ8-THC* | ND | ND | ND | ND | ND | ND |
| Δ8-THC-O | n/a | n/a | n/a | n/a | n/a | n/a |
| Δ9-THC-O | n/a | n/a | n/a | n/a | n/a | n/a |
| Δ8-THCP | n/a | n/a | n/a | n/a | n/a | n/a |
| Δ9-THCP | n/a | n/a | n/a | n/a | n/a | n/a |
| HHC | n/a | n/a | n/a | n/a | n/a | n/a |

FIG. 10

GRINDER FOR PLANT SUBSTANCES

CROSS-REFERENCE TO RELATED APPLICATIONS

This application is a continuation-in-part application of U.S. patent application Ser. No. 17/564,311, entitled "Grinder for Plant Substances," filed Dec. 29, 2021, which claims priority under 35 U.S.C. § 119(e) to U.S. Provisional Patent Application Ser. No. 63/132,092, entitled "Grinder," filed Dec. 30, 2020, the disclosures of which is incorporated herein by reference in its entirety for all purposes.

FIELD OF THE INVENTION

The present invention is directed toward a grinder for plant substances, such as herbs or combustible substances.

BACKGROUND OF THE INVENTION

Often, plant substances, such as herbs or combustible substances, are ground into small pieces prior to use (e.g., for cooking, flavoring, and/or or to produce vapors for inhalation). In the specific case of vaporization (or other such combustion techniques), plant substances may be ground to promote thorough and even combustion. Thus, consumers often use grinders to process plant substances (i.e., chop, grind, or otherwise reduce in size) prior to use (e.g., prior to combusting a plant substance for inhalation).

Many grinders, regardless of their specific intended use, include teeth that tear or grind a plant substance when teeth slide along each other. More specifically, the teeth included in grinders for plant substances typically extend between opposing surfaces, with some teeth extending from one surface into contact with the other and vice versa. Additionally, the teeth are often arranged to slide by each other when one surface is rotated with respect to the other surface. That is, during such a rotation, the teeth typically slide along each (at their radial edges) and/or are only separated by very small gaps (between their radial edges), such as gaps of only a few millimeters ("mm").

The small or nonexistent gaps cause the teeth to grind and/or tear a plant substance when the teeth are rotated with respect to each other, but the small or nonexistent gaps also cause plant substance to stick on the teeth. This may waste plant substance and/or cause the teether to lock up (e.g., after 1-2 mm of ground plant buildup occurs). Wasting substances may be particularly problematic when the plant substance in the grinder is expensive and/or only available in limited quantities (e.g., due to medical dosing). Additionally, the above-described teeth may generate a large amount of sliding friction, creating resistance forces that require a user to exert a large amount of force when grinding a plant substance. This resistance only increases as more plant substance accumulates on the teeth.

SUMMARY OF THE INVENTION

A grinder for plant substances, especially combustible plant substances, is presented herein. According to at least one embodiment, the grinder includes a first surface and an opposing second surface that is separated from the first surface by a first longitudinal gap. Thus, the first surface and the second surface define a receptacle within which a plant substance may be received. The second surface includes holes through which ground pieces of the plant substance may pass and at least one of the first surface and the second surface includes bumps that extend into, but not across, the receptacle. The bumps encourage rolling friction between the plant substance and the bumps so that the plant substance is ground into pieces small enough to pass through the holes. Among other advantages, the bumps reduce or eliminate resistance forces, such as those generated by teeth sliding by each other, which require a user to exert a large amount of force when grinding a plant substance. Moreover, the bumps retain little to no plant substance thereon during the grinding process. That is, the bumps reduce or eliminate build-up. This reduces the amount of material that is wasted and helps prevent rotational resistance from increasing over time.

In at least some embodiments, the bumps are only included on the first surface. In other embodiments, the bumps are only included on the second surface. Still further, in some embodiments, the bumps are first bumps included on the first surface and grinder further comprises second bumps included on the second surface. In any case, some or all of the bumps included in the grinder may be hemispherical knobs.

When the grinder included two surfaces with bumps, apexes of the second bumps may be separated from apexes of the first bumps by a second longitudinal gap that is smaller than the first longitudinal gap. Alternatively, if the grinder included one surface with bumps, apexes of the bumps may be separated from an opposing surface by a second longitudinal gap that is smaller than the first longitudinal gap. In either case, in at least some instances, the second longitudinal gap may span a second longitudinal distance that is equal to or less than approximately 50% of a first longitudinal distance of the first longitudinal gap. For example, the second longitudinal distance may be at least approximately 3 mm (in which case, the first longitudinal distance would be at least approximately 6 mm). As is described in further detail below, the gap may prevent the grinder from resisting rotational movement and/or prevent binding.

In some embodiments, the bumps are patterned between the holes. Additionally or alternatively, the bumps may be patterned symmetrically around or across the at least one of the first surface and the second surface. Still further, the bumps may be patterned linearly across the least one of the first surface and the second surface. Different patterns may provide different levels of reduced friction and/or different grinding effectiveness.

In some aspects, the first surface is a bottom surface of a top grinding section and the second surface is a top surface of a bottom grinding section, the top grinding section being removably coupleable to the bottom grinding section. In some of these embodiments, the grinder further includes one or more sieves positioned to receive the pieces of the plant substance that are small enough to pass through the holes. The one or more sieves can further filter the plant substance based on size. Additionally or alternatively, the grinder may include a catcher positioned to receive portions of the plant substance that pass through the holes and/or the one or more sieves. The catcher and sieves may allow the grinder to capture different granule sizes in different portions so that, for example, a user can retrieve plant pieces of different sizes and/or powder-like plant substance from the grinder.

According to some embodiments, a grinder for plant substances includes a top grinding section, a catcher, and a bottom grinding section. The bottom grinding section is removably coupleable to the top grinding section and removably coupleable to the catcher. Thus, when the grinder is assembled the bottom grinding section will be positioned between the top grinding section and the catcher, and the top grinding section and the bottom grinding section will define a receptacle within which a plant substance may be received. At least one of the top grinding section and the bottom grinding section includes bumps that extend into, but not across, the receptacle. The bumps encouraging rolling friction between the plant substance and the bumps so that the plant substance is ground into pieces. Additionally, the bottom grinding section includes holes through which the pieces of the plant substance may pass to the catcher. This grinder may also include any of the features, and realize any of the advantages of, the grinder embodiments discussed above.

Any of the grinder embodiments discussed above may be composed of a silicone material. For example, in some embodiments, one of the top grinding section or the bottom grinding section is composed of the silicone material, and the other of the top grinding section or the bottom grinding section is composed of a metallic material. In alternative embodiments, a portion (or portions) of the top grinding section and/or the bottom grinding section configured to contact the plant substance may be composed of silicone material. Still further, in some embodiments, each of the top grinding section and the bottom grinding section is composed of a silicone material.

Manufacturing at least one of the top grinding section or the bottom grinding section, or a portion thereof, using silicone may further facilitate passing of ground pieces of plant substance into the holes of the bottom grinding section. For example, the insulative property of the silicone material may reduce static electricity build-up that otherwise may cause pieces of plant substance to adhere to a grinding surface (e.g., bumps, sidewalls) between the top grinding section and the bottom grinding section instead of passing into the holes. Natural properties of silicone may also discourage pieces of plant substance and/or chemicals/compositions thereof from adhering to a grinding surface. For example, the silicone may be more resilient than metal and, thus, may decrease unnecessary stripping or grinding of a plant substance, e.g., as compared to metal. As such, the grinder's silicone composition may improve plant substance yield and/or further reduce build-up of plant substance between the top grinding section and the bottom grinding section.

Other systems, apparatuses, methods, features and advantages will be, or will become, apparent to one with skill in the art upon examination of the following figures and detailed description. All such additional systems, methods, features and advantages are included within this description, are within the scope of the claimed subject matter

BRIEF DESCRIPTION OF THE DRAWINGS

FIG. 10 illustrates a table indicating test results of plant content of ground plant substance yielded as a result of usage of various grinders, according to an example embodiment.

Like reference numerals have been used to identify like elements throughout this disclosure.

DETAILED DESCRIPTION

Present is a grinder that eliminates the teeth used by traditional grinders and replaces these teeth with rounded (e.g. hemispherical) bumps or knobs. That is, the grinder presented herein includes two opposing surfaces, at least one of which includes bumps or knobs, such as hemispherical bumps. The bumps on opposing surfaces do not come into contact with each other, nor do the bumps come into contact with an opposing surfaces of the grinder. Thus, there is a longitudinal gap between apexes of the bumps and apexes of opposing bumps and/or opposing surfaces. These bumps encourage rolling friction between a plant substance and the bumps, thereby drastically lowering the resistance generated during grinding.

The bumps also encourage friction between portions of the plant substance so that friction between different surfaces or portions of the plant substance rubbing together causes grinding of the plant substance. However, importantly, since the bumps do not slide by or along other bumps or surfaces (because there is a longitudinal gap above an apex of each bump), the grinder presented herein does not lock up or bind when ground plant substance builds-up in the grinder. The bumps also encourage flow of the ground plant substance toward one or more holes formed in one of the surfaces (e.g., to flow toward a catcher) for retrieval and/or consumption. Thus, the product presented herein also minimizes waste by reducing or eliminating build-up that occurs with traditional teeth.

Additionally, in at least some embodiments, at least a portion of the grinder is composed of a silicone material. For example, at least one of the bumps and surfaces is composed of the silicone material. The silicone material may improve yield of ground plant substance. In some embodiments, a portion of the grinder is composed of the silicone material and another portion of the grinder is composed of a metallic material. In other embodiments, each portion of the grinder is composed of the silicone material. The silicone material may further promote movement of the ground plant substance toward the one or more holes to limit build-up of the plant substance within the grinder and improve the amount of ground plant substance that can be readily retrieved and/or consumed.

Figure 1:
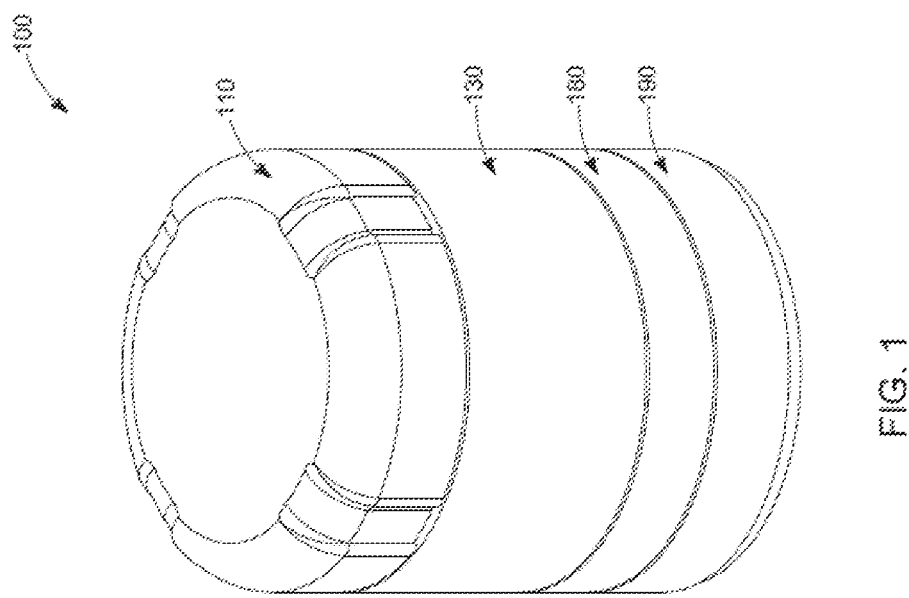
FIG. 1 illustrates a front perspective view of a grinder formed in accordance with an example embodiment of the present invention.
Figure 2:
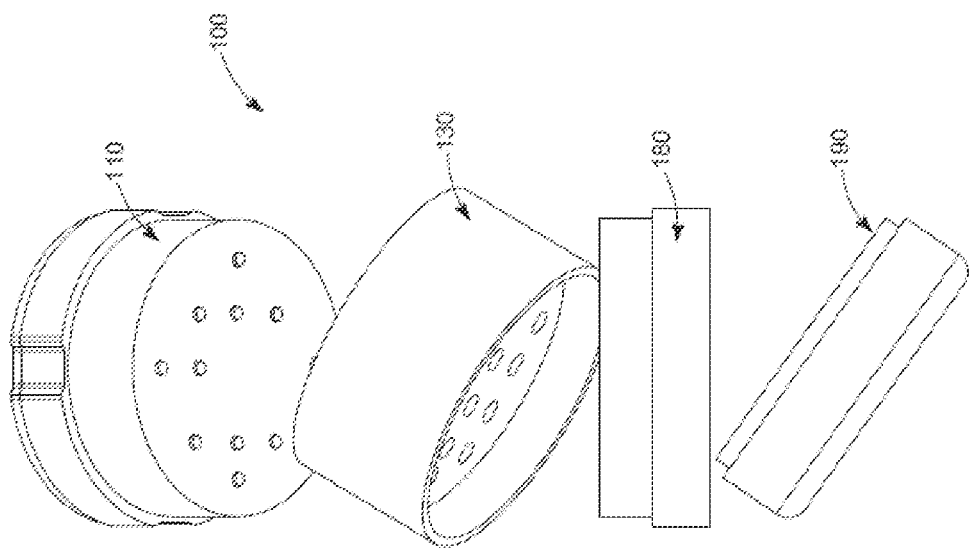
FIG. 2 illustrates a partially exploded view of the grinder of FIG. 1, showing a sieve, a catcher, a top grinding section, and a bottom grinding section disconnected from each other.

Now turning to FIGS. 1 and 2 for a description of an example embodiment of a grinder 100 formed in accordance with the techniques presented herein. As is shown, in one form, the grinder 100 presented herein includes a top grinding section 110, a bottom grinding section 130, a sieve 180, and a catcher 190. The top grinding section 110 is removably coupled to a first side (e.g., a top side) of the bottom grinding section 130 while a second side (e.g., a bottom side) of the bottom grinding section 130 is removably coupleable to a first side (e.g., a top side) of the sieve 180. Thus, the bottom grinding section 130 may be sandwiched between the top grinding section 110 and the sieve 180. Then, the catcher 190 may be removably coupled to a second side (e.g., a bottom side) of the sieve 180 to form a complete unit. Each removably coupling may be achieved in any manner. For example, the sieve 180 may be removably coupled to both the bottom grinding section 130 and the catcher 190 via threads while the top grinding section 110 can be removably coupled to the bottom grinding section 130 via a friction fit and/or magnetic coupling (an example of which is described in further detail below).

As is shown, when assembled, the complete unit may be substantially cylindrical, with sides of the top grinding section 110, bottom grinding section 130, sieve 180, and catcher 190 forming sidewalls that are substantially continuous, except for grips defined by the top grinding section 110. However, this is merely an example, and other embodiments may have any desirable shape or shapes. Moreover, other embodiments may have any number of sieves 180 (e.g., zero, one, two, or more) to provide different levels of filtering between the bottom grinding section 130 and the catcher 190—to capture different sized pieces of ground plant substance in different locations. Still further, some embodiments needs not include the catcher 190 and/or sieve 180 as separate parts and any combination of these parts, or the functions thereof, could be built into the bottom grinding section 130.

Figure 3:
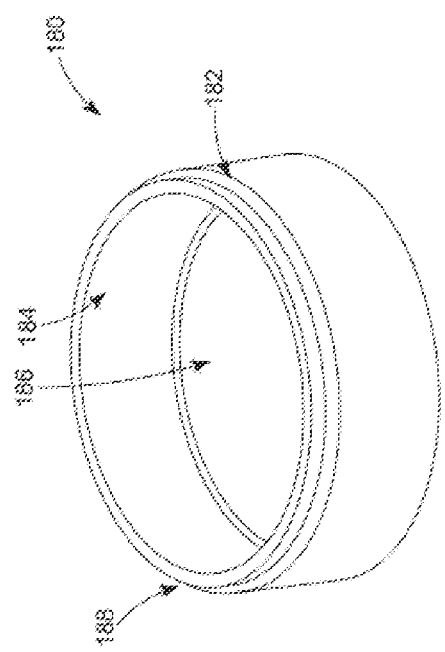
FIG. 3 illustrates a top perspective view of the sieve included in the grinder of FIG. 1, according to an example embodiment.

Now turning to FIG. 3, the sieve 180 may be or act as a filter to regulate the size of ground plant substance that can pass into the catcher 190. In the depicted embodiment, the sieve 180 includes a sidewall 182 that defines a central opening 184 and a filter 186 spans the central opening 184, between the interior edges of the sidewall 182. A top of the sidewall 182 defines a seat 188 that can receive the bottom grinding section 130 and removably couple the sieve 180 to the bottom grinding section 130. Although not shown, a bottom of sidewall 182 includes similar features to couple the sieve 180 to the catcher 190. Moreover, although not shown, the sidewall 182 can include features, such as threads, to removably couple the sieve 180 to the bottom grinding section 130 and/or the catcher 190

Figure 4:
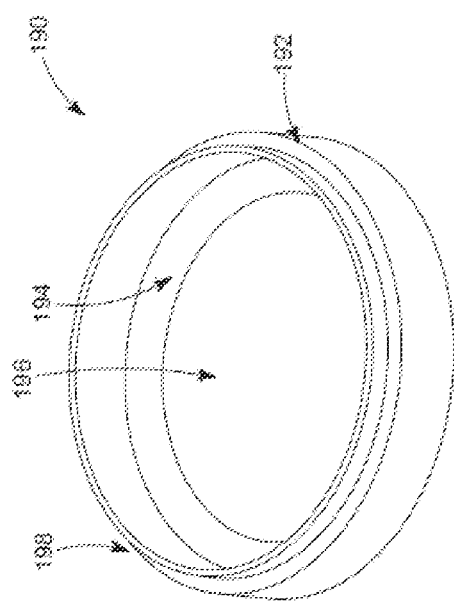
FIG. 4 illustrates a top perspective view of the catcher included in the grinder of FIG. 1, according to an example embodiment.

FIG. 4 illustrates the catcher 190 included in the depicted embodiment. As is shown, the catcher 190 includes a sidewall 192 and a bottom 194 that, together, define a receptacle 196 within which pieces or granules of ground plant substance can be collected. For example, in some embodiments, one or more sieves 180 may be configured to only allow fine granules of a ground plant substance to pass to the catcher 190 and, thus, the bottom 194 will hold a powdered version of the ground plant substance (e.g., crystals and/or trichomes) after a grinding operation. A top of the sidewall 192 defines a seat 198 that can receive the sieve 180 (or the lowermost sieve 180 in a grinder that includes multiple sieves) and removably couple the catcher 190 to the sieve 180. Although not shown, the sidewall 192 can include features, such as threads, to removably couple the catcher to one or more sieves 180, the bottom grinding section 130, or any other component.

Now turning to FIGS. 5-8, regardless of the number, shape, size, and configuration of sieve 180 and/or catcher 190, the top grinding section 110 and the bottom grinding section 130 collectively form a chamber or receptacle 150 (see FIG. 8) in which a plant substance can be received. Critically, at least one of top grinding section 110 and bottom grinding section 130 includes a surface with bumps that extend into the receptacle 150. However, for simplicity and brevity, the Figures illustrate an embodiment where the top grinding section 110 has a first surface 120 (e.g., a bottom surface) with a plurality of second bumps 122 and the bottom grinding section 130 has a second surface 140 with a plurality of second bumps 142. Bumps 122 and 142 each extend into the receptacle 150 but do not extend through the receptacle 150. Thus, the bumps 122 do not create frictional resistance for bumps 142 and vice versa.

Figure 5:
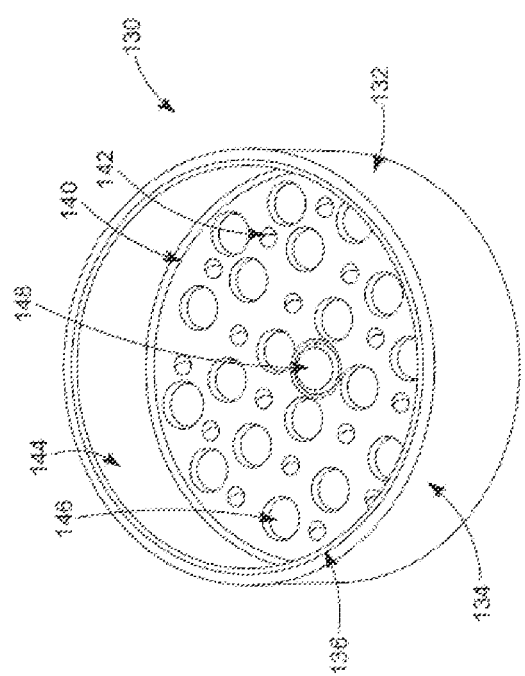
FIG. 5 illustrates a top perspective view of the bottom grinding section included in the grinder of FIG. 1, according to an example embodiment.

As is shown in FIG. 5, in the depicted embodiment, the bottom grinding section 130 includes an annular sidewall 132 with an outer surface 134, a top edge 136, and an inner surface 144. A planar surface 140 extends from the inner surface 144 of the annular sidewall 132, adjacent or proximate to a bottom of the annular sidewall 132. Thus, the second surface 140 and the outer surface 134 define an open-top cavity within which plant substances can be received. As is shown, the second surface 140 of the bottom grinding section 130 includes holes 146 sized to allow pieces of a ground plant substance to pass through the second surface 140, for example, towards the catcher 190. However, in at least some embodiments, the sieve 180 is disposed between the bottom grinding section 130 and the catcher 190 and, thus, can further filter or sort ground plant substances based on size prior to the ground plant substance reaching the catcher 190.

As mentioned, the second surface 140 also includes bumps 142 (i.e. knobs 142). The bumps 142 extend longitudinally from the second surface 140, into the open-top cavity of the bottom grinding section 130. In the depicted embodiment, the bumps 142 are hemispherical. But, in other embodiments, the bumps 142 may have any desired shape, provided that a top surface of the bumps is rounded and/or encourages rolling friction. Alternatively, if the top grinding section 110 includes bumps 122, the bottom grinding section 130 might not include bumps 142.

In the depicted embodiment, the holes 146 are patterned linearly across the second surface 140. Specifically, six parallel lines of holes 146 extend across the second surface 140, from one side to the other (without each line extending through a center of the circular second surface 140) and the holes 146 are evenly spaced across these lines. Meanwhile, the bumps 142 are evenly spaced across parallel lines disposed between the lines of holes 146. This creates an arrangement where the holes 146 and bumps 142 are symmetrical across the second surface 140 when viewed with respect to a diameter of the second surface 140 that extends parallel to the lines of holes 146 and bumps 142 the second surface 140. That is, one half of the second surface 140 mirrors or matches another half of the second surface 140.

However, the depicted arrangement of holes 146 and bumps 142 is just one arrangement and, in other embodiments, bumps 142 and/or holes 146 may be patterned or arranged in any other manner. Moreover, the pattern of bumps 142 and the pattern of holes 146 need not match. For example, bumps 142 could be patterned around a center of the circular second surface 140 so that the bumps are symmetrical around the second surface 140. Alternatively, different numbers of bumps may be positioned on different radial lines extending from a center of the second surface 140. Meanwhile, holes 146 can be positioned between bumps 142 in any desirable arrangement.

Still referring to FIG. 5, in the depicted embodiment, the second surface 140 includes a magnet 148. The magnet 148 is centered on the second surface 140 and extends above the bumps 142. Thus, when the magnet 148 contacts a corresponding magnet included on the top grinding section 110, a height of magnet 148 can at least partially define a receptacle 150 that allows the bumps 142 to extend into the receptacle 150 without extending through the receptacle 150. As an example, the bumps 142 may have a longitudinal dimension (i.e., height) of approximately 1.5 mm and magnet 148 may have a longitudinal dimension of approximately 3 mm. Thus, if a corresponding magnet (e.g., magnet 128 of FIG. 6) included in the top grinding section 110 also has a longitudinal dimension of approximately 3 mm, the receptacle 150 will have a longitudinal dimension of approximately 6 mm and the bumps 142 will extend across only 1.5 mm of this 6 mm span.

However, to be clear, magnet 148 is only an example of a feature that can removably couple the top grinding section 110 to the bottom grinding section 130. Likewise, magnet 148 is only an example of a feature that can define a longitudinal dimension of the receptacle 150. In other embodiments, the bottom grinding section 130 and/or top grinding section 110 can include any desirable feature or features to achieve these aspects. For example, the bottom grinding section 130 and/or top grinding section 110 can include any number of components that allow removable coupling, in addition to or in lieu of magnets, arranged in any arrangement. Additionally or alternatively, walls of grinding sections 110 and 130 (e.g., sidewall 132) can be configured to engage each other in a manner that defines the longitudinal dimension of the receptacle 150 and/or removably couples the grinding sections 110 and 130 together (i.e., regardless of magnets or other such couplers included in these sections).

Figure 6:
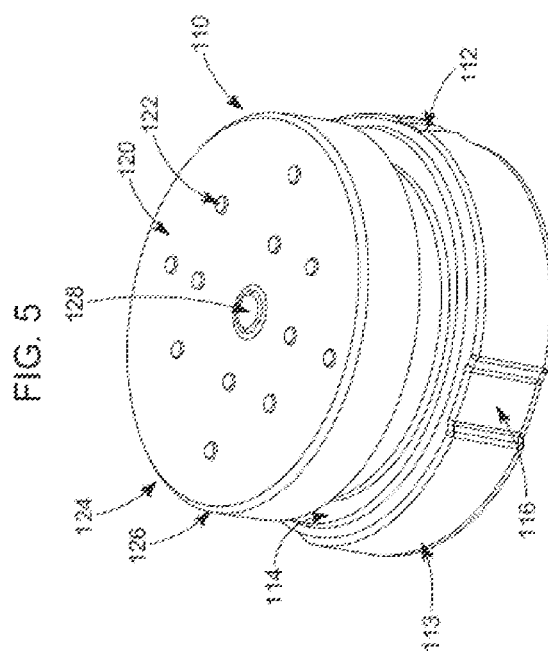
FIG. 6 illustrates a bottom perspective view of the top grinding section included in the grinder of FIG. 1, according to an example embodiment.

Now turning to FIG. 6, in the depicted embodiment, the top grinding section 110 includes a grip section 112 and a grinding section 124. The grip section 112 has a top 113 and a sidewall 116 that extends away from the top 113, towards the grinding section 124. As is shown, in at least some embodiments, the sidewall 116 of the grip section 112 may have grooves and an ergonomic shape to enable easy gripping and rotation.

Meanwhile, the grinding section 124 has a bottom planar surface 120 (i.e., first surface 120) and a sidewall 126 that extends away from the first surface 120, towards the grip section 112. As can be seen, the sidewall 126 is positioned substantially within the dimensions of the sidewall 116 so that a shoulder 114 is defined between the grinding section 124 and the grip section 112. In the depicted embodiment, the sidewall 116 is sized to fit within the annular sidewall 132 of the bottom grinding section 130 while sidewall 116 is larger than the annular sidewall 132. Thus, shoulder 114 may define a longitudinal distance that the grinding section 124 extends into the bottom grinding section 130. In turn, this can at least partially define a longitudinal distance of the receptacle 150 defined between the first surface 120 of the top grinding section 110 and the second surface 140 of the bottom grinding section 130. As is shown, in at least some embodiments, the shoulder 114 may include grooves (e.g., a track) that allow the grip section 112 to ride on and/or seal against a top edge 136 of the annular sidewall 132 of the bottom grinding section 130.

However, in other embodiments, the top grinding section 110 need not include a shoulder 114 and/or the grinding section 124 need not be sized to fit into the bottom grinding section 130. For example, sidewall 126 might be sized to mate with the top edge 136 of the annular sidewall 132 (of the bottom grinding section 130) so that the top grinding section 110 sits atop the bottom grinding section 130 (without entering the open-top cavity defined by the bottom grinding section 130). Alternatively, the sidewall 126 might be sized to enter the open-top cavity defined by the bottom grinding section 130, but the longitudinal dimension of the receptacle 150 defined between the top grinding section 110 and the bottom grinding section 130 might be defined entirely by other features included on the first surface 120 and/or second surface 140.

In the depicted embodiment, the first surface 120 includes bumps 122 (i.e. knobs 122). The knobs extend longitudinally from the first surface 120, away from the top grinding section 110. In the depicted embodiment, the bumps 122 are hemispherical. But, in other embodiments, the bumps 122 may have any desired shape, provided that a top surface of the bumps is rounded and/or encourages rolling friction. Alternatively, if the bottom grinding section 130 includes bumps 142, the top grinding section 110 might not include bumps 122.

In the depicted embodiment, the bumps 122 are included on radial lines that extend from a center of the first surface 120, patterned so that the lines alternate between including one bump or two bumps. This creates an arrangement where bumps 122 are symmetrical across the first surface 120 when viewed with respect to multiple diameters of the top grinding section 110. However, the depicted arrangement of bumps 122 is just one arrangement and, in other embodiments, bumps 122 may be patterned or arranged in any other manner. Moreover, the pattern of bumps 122 on the first surface 120 need not match a pattern of bumps 142 included on the second surface 140. Instead, any numbers of bumps 122 may be positioned in any desirable arrangement across and/or around first surface 120 and any numbers of bumps 142 may be positioned in any desirable arrangement across and/or around first surface 140, independent of the arrangement of bumps 122 on first surface 120. For example, bumps 122 could be patterned around a center of the circular first surface 120 so that the bumps 122 are symmetrical around the first surface 120 while bumps 142 are symmetrical across the second surface 140.

Still referring to FIG. 6, in the depicted embodiment, the first surface 120 includes a magnet 128 that is configured to mate with magnet 148 (of second surface 140). Thus, the magnet 128 is centered on the first surface 120 and extends above the bumps 122 so that, a height of magnet 128 can at least partially define a receptacle 150 and allow the bumps 122 to extend into the receptacle 150 without extending through the receptacle 150. As an example, the bumps 122 may have a longitudinal dimension (i.e., height) of approximately 1.5 mm and magnet 128 may have a longitudinal dimension of approximately 3 mm. Thus, if magnet 148 of second surface 140 also has a longitudinal dimension of approximately 3 mm, the receptacle 150 will have a longitudinal dimension of approximately 6 mm and the bumps 122 will extend across only 1.5 mm of this 6 mm span, either in alignment with or out of alignment with bumps 142.

To reiterate, magnets 128 and 148 are only an example of a feature that can removably couple the top grinding section 110 to the bottom grinding section 130 and/or define a longitudinal dimension of the receptacle 150. However, generally, features and/or structures that allow movement of one of the top grinding section 110 to the bottom grinding section 130 with respect to the other while providing a removable coupling therebetween, like magnets 128 and 148, may be advantageous. This is because such features may secure grinding sections 110 and 130 together during grinding operations, where a user must rotate one of grinding section 110 or 130 with respect to the other. In the depicted embodiment, the centered location of magnets 128 and 148 also defines a rotational axis for one of grinding section 110 or 130 to rotate with respect to the other. However, in other embodiments, engagement between sidewalls 126 and 132, or any other desirable feature, could also define a rotational axis for one of grinding section 110 or 130 to rotate with respect to the other.

At least a portion of the grinder 100 may be composed of a silicone material, such as silicone rubber (e.g., without substantial amounts of phthalates, ethers, biphenyls, and/or metals). In some embodiments, one of the top grinding section 110 or the bottom grinding section 130 is composed of the silicone material, and the other of the top grinding section 110 or the bottom grinding section 130 is composed of a non-silicone material, such as a metallic material. In other embodiments, each of the top grinding section 110 and the bottom grinding section 130 is composed of a silicone material.

As an example, a specific part of the top grinding section 110 and/or the bottom grinding section 130 is composed of the silicone material. For instance, any of the first surface 120 of the top grinding section 110, the sidewall 126 of the top grinding section 110, the second surface 140 of the bottom grinding section 130, the inner surface 144 of the bottom grinding section 130, or the bumps 122, 142 may be composed of the silicone material. However, a remaining part of the top grinding section 110 and/or the bottom grinding section 130 may be composed of a non-silicone material (e.g., a metallic material). As another example, an entirety of the top grinding section 110 and/or of the bottom grinding section 130 is composed of a silicone material.

The silicone material of the grinder 100 may further promote movement of the ground plant substance toward the holes 146. For example, the silicone material may reduce adherence of the ground plant substance onto the top grinding section 110 (e.g., onto the first surface 120, onto the sidewall 126, onto the bumps 122) and/or onto the bottom grinding section 130 (e.g., onto the second surface 140, onto the sidewall 132, onto the bumps 142) to facilitate movement of the ground plant substance within the chamber 150 and toward the holes 146. Natural properties of silicone may also discourage pieces of plant substance and/or chemicals/compositions thereof from adhering to a grinding surface. For example, the silicone may be more resilient than metal and, thus, may decrease unnecessary stripping or grinding of a plant substance, e.g., as compared to metal.

Figure 7:
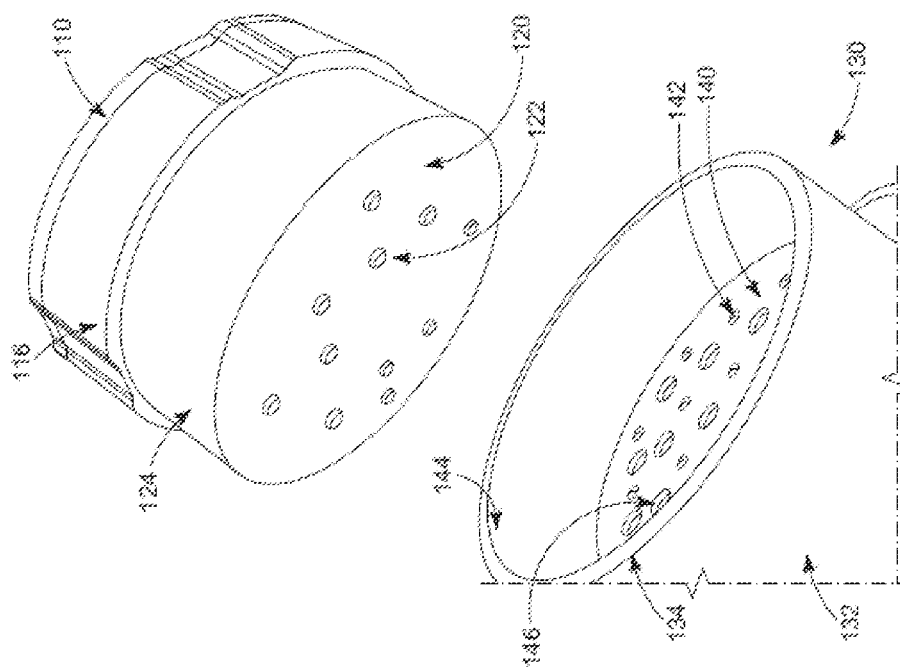
FIG. 7 illustrates a front perspective view of the top and bottom grinding sections included in the grinder of FIG. 1, according to an example embodiment.
Figure 8:
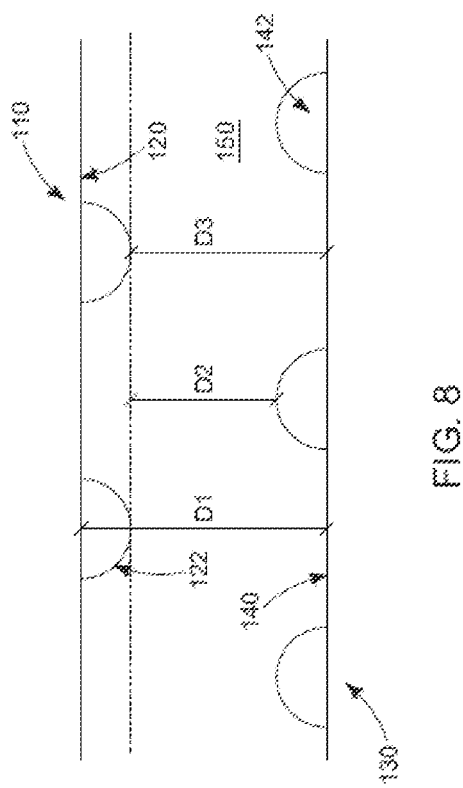
FIG. 8 illustrates a schematic, side sectional view of the top and bottom grinding sections included in the grinder of FIG. 1 while coupled together, according to an example embodiment.

Now turning to FIGS. 7 and 8, when the top grinding section 110 is installed in and/or coupled to the bottom grinding section 130, any bumps included on the first surface 120 or the second surface 140 extend into the receptacle 150. In the depicted embodiment, grinding sections 110 and 130 each include bumps—bumps 122 and 142, respectively—that project from a relatively flat/planar face 120 and 140, respectively, and thus, two sets of bumps extend into the receptacle 150. Moreover, in the depicted embodiment, planar faces 120 and 140 are configured to sit parallel to each other when the grinder 100 is assembled. Thus, apexes of bumps 122 and 142 extend towards each other when grinder sections 110 and 130 are coupled together. However, the apexes of bumps 122 and 142 do not contact each other. Instead, there is a longitudinal gap disposed therebetween.

More specifically, if one bump of bumps 122 and one bump of bumps 142 are disposed on one axis extending perpendicularly between the two opposing faces 120, 140 of the grinding sections 110 and 130, a gap will be present along that axis, between apexes of the two bumps. Such a gap is depicted schematically in FIG. 8 as having a longitudinal distance D2 that is smaller than the longitudinal distance D1 of the receptacle 150. Alternatively, if one bump of bumps 122 and one bump of bumps 142 are disposed on different axes extending perpendicularly between the two opposing faces 120, 140 of grinding sections 110 and 130, a gap will be present along that axis, between the apex of the bump and its opposing surface. Such a gap is depicted schematically in FIG. 8 as having a longitudinal distance D3 that is smaller than the longitudinal distance D1 of the receptacle 150. A gap with a longitudinal distance D3 may also be created when only one of face 120 or face 140 includes bumps (i.e., if bumps 122 or bumps 142 are not included in grinder 100).

In some embodiments, a gap disposed above an apex of a bump may be proportional to the overall gap size of the receptacle. For example, distance D2 and/or distance D3 may be equal to or less than approximately 50% of the overall longitudinal distance D1 of the receptacle 150. Alternatively, distance D2 and/or distance D3 may be equal to or less than approximately 60%, approximately 75%, approximately 85%, or approximately 90% of the overall longitudinal distance D1 of the receptacle 150. As a specific example, D2 may be approximately 3 mm, D1 may be approximately 6 mm, and D3 may be approximately 4.5 mm. In any case, providing a longitudinal gap above a bump may ensure that the bump does not generate frictions with another surface of the grinder and create resistance forces that require a user to exert a large amount of force when grinding a plant substance. Instead, the bumps encourage rolling friction between the plant substance and the bumps so that the plant substance is ground into pieces small enough to pass through the holes 146 in the bottom grinding section 130.

However, to be clear, the embodiment depicted in FIGS. 7 and 8 is only an example and is not intended to be limiting. For example, in different embodiments, surfaces 120 and 140 need not be flat and could still incorporate bumps with longitudinal gaps disposed there above. That is, surface 120 and surface 140 could each be concave, convex, or irregularly shaped and still implement the concepts presented herein. Likewise, bumps 122 and/or bumps 142 need not be hemispherical and may be rounded in any manner. Still further, the apexes of bumps 122 and 142, as well as the surfaces 120 and 140 of grinding sections 110 and 130 may be spaced apart by any amount of space and such space may vary across a single embodiment (e.g., by varying sizes or shapes of bumps and/or by providing a non-flat (e.g., undulating or convex) surface).

Figure 9:
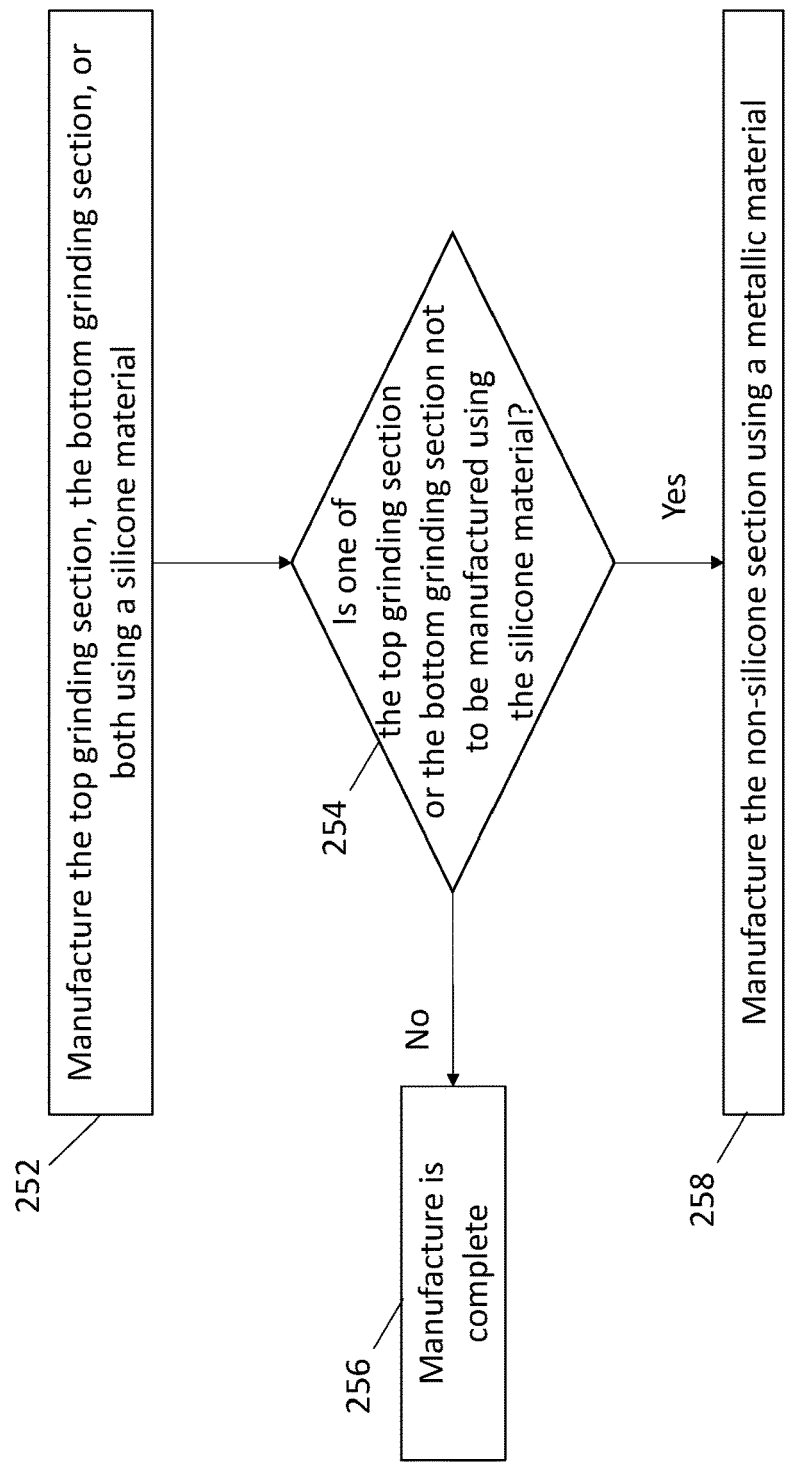
FIG. 9 illustrates a flowchart of a method of manufacture of the grinder of FIG. 1, according to an example embodiment.

FIG. 9 is a flowchart of an embodiment of a method 250 of manufacture of the grinder 100. In some embodiments, at least a portion of the method 250 may be manually performed, such as by an individual person. In additional or alternative embodiments, at least a portion of the method 250 may be automatically performed, such as by machinery. It should also be noted that the operations of the method 250 may be performed differently than depicted. For example, an additional operation may be performed, and/or any of the depicted operations of the method 250 may be removed, performed differently, and/or performed in a different order.

At block 252, the top grinding section 110, the bottom grinding section 130, or both are manufactured using a silicone material, such as silicone rubber that does not include certain additives (e.g., a phthalate, a phenyl, an ether, a metal). In some embodiments, the top grinding section 110 and/or the bottom grinding section 130 may be molded using the silicone material. In additional or alternative embodiments, the top grinding section 110 and/or the bottom grinding section 130 may be manufactured via an additive manufacturing process (e.g., three-dimensional printing) using the silicone material. Indeed, any suitable technique may be performed to manufacture the top grinding section 110 and/or the bottom grinding section 130 using the silicone material. Additionally, in embodiments in which both the top grinding section 110 and the bottom grinding section 130 are manufactured using the silicone material, the same or a different manufacturing technique may be used to manufacture the top grinding section 110 and the bottom grinding section 130.

At block 254, a determination is made regarding whether one of the top grinding section 110 or the bottom grinding section 130 is not to be manufactured using a silicone material. For example, one of the top grinding section 110 or the bottom grinding section 130 is manufactured using a silicone material and the other of the top grinding section 110 or the bottom grinding section 130 is not to be manufactured using a silicone material. At block 256, if both the top grinding section 110 and the bottom grinding section 130 are manufactured using a silicone material, then manufacture of the grinder 100 is complete. As a result, no additional manufacturing operations associated with the grinder 100 are to be performed.

However, at block 258, if one of the top grinding section 110 or the bottom grinding section 130 is not manufactured using a silicone material, then that section is manufactured using a metallic material. That is, if the top grinding section 110 is not to be manufactured using a silicone material, the top grinding section 110 is manufactured using a metallic material. Similarly, if the bottom grinding section 130 is not to be manufactured using a silicone material, the bottom grinding section 130 is manufactured using the metallic material. In this manner, one of the top grinding section 110 or the bottom grinding section 130 is composed of a silicone material, and the other of the top grinding section 110 or the bottom grinding section 130 is composed of a metallic material. Any suitable manufacturing technique, such as machining, casting, extrusion, punching, welding, forging, cutting, and/or folding, may be used to manufacture the top grinding section 110 or the bottom grinding section 130 using the metallic material. Additionally, although the method 250 indicates that the non-silicone section is manufactured using a metallic material, it should be noted that in additional or alternative embodiments, the non-silicone section may be manufactured using any other suitable non-silicone material.

FIG. 10 illustrates a table 300 providing experimental test results of plant material of ground plant substance yielded as a result of usage of various grinders. In other words, the table 300 indicates material that goes through the respective grinders (e.g., by passing through holes of the grinders) instead of building up within the grinder (e.g., by adhering to grinder teeth). Thus, the table 300 represents efficiency of each grinder to provide plant material that is readily available for retrieval and/or consumption.

The table 300 includes multiple columns to represent different grinders used for the experiment. Such grinders include a first grinder 302, a second grinder 304, a third grinder 306, a fourth grinder 308, a fifth grinder 310, and a sixth grinder 312. Each grinder includes different features, such as different grinding/tearing features and/or different material compositions. For example, the first grinder 302 includes diamond shaped teeth, the second grinder 304 includes square shaped teeth, the third grinder 306 includes crescent moon shaped teeth, the fourth grinder 308 includes blender style blades, the fifth grinder 310 includes rounded bumps of the present application (e.g., the bumps 142) and is composed of a metallic material, and the sixth grinder 312 includes rounded bumps of the present application (e.g., bumps 142) and is composed of a silicone material.

The table 300 also includes multiple rows indicating different variables related to usage of each grinder. For example, the table 300 includes a control variable section 314 and a dependent variable section 316. The control variable section 314 provides information related to control variables, which are of the respective plant being grinded by each grinder. As shown in the control variable section 314, multiple properties of the control variable, including the identification, type, volume, and moisture correction, remain the same for each grinder. Other properties of the control variable, including the sample weight and temperature, slightly fluctuate. The grinders were tested by using the same method of grinding, such as a quantity of twists for grinding and/or a quantity of taps, to move ground plant substance through holes or other passageways out of a grinding chamber.

The dependent variable section 316 provides information related to the dependent variables, which are related to resulting desirable plant material of ground plant substance yielded by using the grinders to grind the respective plants having the properties described above. In other words, the dependent variable section 316 indicates the plant material that may become readily available via the same grinding technique used for each grinder. Thus, the dependent variable section 316 may represent effectiveness and/or efficiency of each grinder relative to one another.

As shown in the dependent variable section 316, the total tetrahydrocannabinol (THC) percentage, along with the tetrahydrocannabinolic acid (THC-A) percentage, for the fifth grinder 310 and for the sixth grinder 312 were relatively greater than that for the first grinder 302, for the second grinder 304, for the third grinder 306, and for the fourth grinder 308, with the fifth grinder 310 yielding a slightly greater THC percentage and THC-A percentage than that for the sixth grinder 312 (e.g., at least 1.4 percentage points and at least 1.6 percentage points, respectively). Additionally, the cannabigerolic acid (CBG-A) percentage and cannabichromenic acid (CBC-A) percentage for the fifth grinder 310 and for the sixth grinder 312 were relatively greater than that for the first grinder 302, for the second grinder 304, for the third grinder 306, and for the fourth grinder 308, with the sixth grinder 312 yielding greater CBG-A than that for the fifth grinder 310, and the fifth grinder 310 yielding greater CBC-A than that of the sixth grinder 312. Furthermore, the terpenes yield for the sixth grinder 312 was relatively greater than that for the first grinder 302, for the second grinder 304, for the third grinder 306, for the fourth grinder 308, and for the fifth grinder 310. At the percentages at-issues, these increases are significant. Moreover, the chemicals/substances being measured may be particularly important for medicinal and/or recreational usages and, thus, the percentage increases may be particularly critical for end users.

In this manner, usage of the fifth grinder 310 and of the sixth grinder 312, each of which uses rounded bumps for grinding/tearing, yields relatively greater THC, THC-A, CBG-A, and CBC-A as compared to the first grinder 302, the second grinder 304, the third grinder 306, and the fourth grinder 308. In addition, usage of the sixth grinder 312, which includes silicone material, yields relatively greater terpenes than the first grinder 302, second grinder 304, third grinder 306, fourth grinder 308, and the fifth grinder 310. As such, implementation of rounded bumps in a grinder may improve yield of certain plant material resulting from usage of the grinder and improve the composition of the ground plant substance. Moreover, manufacturing at least a portion of the grinder with rounded bumps using a silicone material may further improve yield of certain plant material resulting from usage of the grinder. As such, manufacturing a grinder having bumps and being composed of a silicone material can improve efficiency and/or effectiveness of the grinder to promote movement of ground plant substance out of the grinder and reduce build-up of ground plant substance in the grinder.

More generally, while the grinder presented herein has been illustrated and described in detail and with reference to specific embodiments thereof, it is nevertheless not intended to be limited to the details shown, since it will be apparent that various modifications and structural changes may be made therein without departing from the scope the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the grinder of the present invention, or portions thereof, may be fabricated from any suitable material or combination of materials, provided that the device, or portions thereof, can function as described herein (e.g., to form sealed connections). Example materials include plastic, foamed plastic, wood, cardboard, pressed paper, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Additionally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A grinder for a plant substance, comprising:
a first grinding section comprising a first surface; and
a second grinding section comprising a second surface and a sidewall extending from the second surface, wherein an edge of the sidewall of the second grinding section is configured to abut the first grinding section to form a gap that separates the first surface and the second surface from one another,
wherein at least one of the first surface or the second surface includes bumps that extend into, but not across, the gap formed by abutment of the edge of the sidewall of the second grinding section against the first grinding section to encourage rolling friction between the plant substance and the bumps to grind the plant substance, and at least a portion of one of the first grinding section or the second grinding section is composed of a silicone material.

2. The grinder of claim 1, wherein the silicone material comprises a silicone rubber.

3. The grinder of claim 1, wherein one of the first grinding section or the second grinding section comprises the silicone material, and another of the first grinding section or the second grinding section comprises a metallic material.

4. The grinder of claim 1, wherein the first grinding section comprises a shoulder surrounding the first surface, and the edge of the sidewall of the second grinding section is configured to abut the shoulder to form the gap that separates the first surface and the second surface from one another.

5. The grinder of claim 1, wherein the second surface comprises a hole through which ground pieces of plant substance may pass.

6. The grinder of claim 5, comprising one or more sieves configured to receive the ground pieces of the plant substance passing through the hole and to filter the ground pieces of the plant sub stance.

7. The grinder of claim 6, comprising a catcher configured to receive portions of the ground pieces of the plant substance that pass through the one or more sieves.

8. The grinder of claim 1, wherein the second surface and the sidewall of the second grinding section cooperatively define a cavity, and the abutment of the edge of the sidewall of the second grinding section against the first grinding section disposes the first surface within the cavity.

9. A grinder, comprising:
a first grinding section comprising a first surface; and
a second grinding section comprising a second surface and a sidewall extending from the second surface, wherein an edge of the sidewall is configured to engage the first grinding section to define a receptacle extending between the first surface and the second surface, the receptacle being configured to receive a plant substance,
wherein at least one of the first surface or the second surface comprises bumps that extend into, but not across, the receptacle defined by engagement of the edge of the sidewall of the second grinding section with the first grinding section, the bumps encourage rolling friction between the plant substance and the bumps to grind the plant substance into pieces, and the bumps are composed of a silicone material.

10. The grinder of claim 9, wherein both the first surface and the second surface comprise the bumps that are composed of the silicone material.

11. The grinder of claim 10, wherein apexes of opposing bumps of the first surface and the second surface are separated by a gap extending within the receptacle defined by engagement of the edge of the sidewall of the second grinding section with the first grinding section.

12. The grinder of claim 9, wherein the edge of the sidewall of the second grinding section is configured to engage the first surface to define the receptacle.

13. The grinder of claim 9, wherein the second surface comprises a hole configured to discharge ground pieces of the plant substance out of the receptacle.

14. The grinder of claim 9, wherein at least one of the first surface or the second surface is composed of the silicone material.

15. The grinder of claim 9, wherein an entirety of at least one of the first grinding section and the second grinding section is composed of the silicone material.

16. The grinder of claim 9, wherein the first grinding section comprises an additional sidewall extending from the first surface, and the engagement of the edge of the sidewall of the second grinding section with the first grinding section positions the additional sidewall of the first grinding section within a cavity cooperatively defined by the second surface and the sidewall of the second grinding section.

17. The grinder of claim 9, wherein the first surface comprises a first magnet, the second surface comprises a second magnet, and the first magnet and the second magnet are configured to engage one another to maintain the engagement of the edge of the sidewall of the second grinding section with the first grinding section.

18. A method of manufacturing a grinder, comprising:
manufacturing one of a first grinding section or a second grinding section of the grinder using a silicone material, wherein the first grinding section comprises a first surface, and the second grinding section comprises a second surface and a sidewall extending from the second surface, an edge of the sidewall is configured to abut the first grinding section to form a gap between the first surface and the second surface, at least one of the first surface or the second surface includes bumps that extend into, but not across, the gap formed by abutment of the sidewall against the first grinding section to encourage rolling friction between a substance and the bumps to grind the substance; and
manufacturing another of the first grinding section or the second grinding section of the grinder using the silicone material or a metallic material.

19. The method of claim 18, comprising manufacturing both the first grinding section and the second grinding section using the silicone material.

20. The method of claim 18, wherein manufacturing one of the first grinding section or the second grinding section using the silicone material comprises molding the one of the first grinding section or the second grinding section using the silicone material.

* * * * *

UNITED STATES PATENT AND TRADEMARK OFFICE
CERTIFICATE OF CORRECTION

Page 1 of 1

PATENT NO. : 12,383,099 B2
APPLICATION NO. : 18/208424
DATED : August 12, 2025
INVENTOR(S) : Rodrigo Escorcio Santos It is certified that error appears in the above-identified patent and that said Letters Patent is hereby corrected as shown below:

In the Claims

Claim 6, Column 14, Line 46, please replace "pieces of the plant sub stance" with --pieces of the plant substance--

Signed and Sealed this
Thirtieth Day of September, 2025

John A. Squires
*Director of the United States Patent and Trademark Office*